_(12)_ United States Patent
Toksvig

(10) Patent No.: US 7,684,641 B1
(45) Date of Patent: Mar. 23, 2010

(54) INSIDE TESTING FOR PATHS USING A DERIVATIVE MASK

(75) Inventor: Michael J. M. Toksvig, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1134 days.

(21) Appl. No.: 11/301,394

(22) Filed: Dec. 13, 2005

(51) Int. Cl.
*G06K 9/40* (2006.01)
(52) U.S. Cl. .................................................... 382/274
(58) Field of Classification Search ................. 382/283
See application file for complete search history.

(56) References Cited

U.S. PATENT DOCUMENTS

| | | | | |
|---|---|---|---|---|
| 5,038,383 A | * | 8/1991 | Usumoto et al. | 382/235 |
| 5,386,509 A | * | 1/1995 | Suzuki et al. | 345/501 |
| 5,553,161 A | * | 9/1996 | Fischer | 382/167 |
| 6,426,755 B1 | * | 7/2002 | Deering | 345/581 |
| 7,425,960 B2 | * | 9/2008 | Dowling et al. | 345/467 |
| 2002/0054712 A1 | * | 5/2002 | Sun | 382/274 |

OTHER PUBLICATIONS

Neider et al., "Drawing Filled, Concave Polygons Using the Stencil Buffer", The Official Guide to Learning OpenGL, Release 1, Chapter 13, pp. 12-14, 1994 http://fly.cc.fer.hr/~unreal/theredbook/chapter13.html.

* cited by examiner

*Primary Examiner*—Bhavesh M Mehta
*Assistant Examiner*—Alex Liew
(74) *Attorney, Agent, or Firm*—Patterson & Sheridan, LLP

(57) ABSTRACT

Systems and methods for identifying pixels that are inside a two-dimensional path may be used to fill the path. The path is segmented and a slope direction is determined for each pixel that is covered by the segmented path. The slope directions are stored in a derivative mask that may be integrated for each scanline to produce a fill mask. The resulting fill mask indicates the pixels that are inside the two-dimensional path. The fill mask may be used to fill the path.

6 Claims, 11 Drawing Sheets

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | .38 | .68 | .16 | 0 | 0 |
| 0 | 0 | 0 | 0 | 0 | 0 | 0 | .35 | .93 | 1 | .86 | .38 | 0 |
| 0 | 0 | 0 | 0 | 0 | 0 | .31 | .87 | 1 | 1 | 1 | .97 | 0 |
| 0 | 0 | 0 | 0 | 0 | .22 | .85 | 1 | 1 | 1 | 1 | 1 | 0 |
| 0 | 0 | 0 | 0 | .17 | .80 | 1 | 1 | 1 | 1 | 1 | 1 | 0 |
| 0 | 0 | 0 | .15 | .88 | 1 | 1 | 1 | 1 | 1 | 1 | 1 | 0 |
| 0 | 0 | .12 | .82 | 1 | 1 | 1 | 1 | 1 | 1 | 1 | 1 | 0 |
| 0 | 0 | .68 | .99 | 1 | 1 | 1 | 1 | 1 | 1 | 1 | 1 | 0 |
| 0 | 0 | 0 | .08 | .24 | .36 | .48 | .61 | .73 | .86 | 1 | 1 | 0 |
| 0 | 0 | 0 | 0 | 0 | 0 | 0 | 0 | 0 | .01 | .09 | .36 | 0 |

Fill Mask 510

INSIDE TESTING FOR PATHS USING A DERIVATIVE MASK

BACKGROUND OF THE INVENTION

1. Field of the Invention

Embodiments of the present invention generally relate to determining pixels that are inside a two-dimensional path and, more specifically, to producing a derivative mask that stores a slope direction for each pixel along the two-dimensional path.

2. Description of the Related Art

Conventionally a two-dimensional path is triangulated in order to fill the pixels that are inside the path. Triangulation is a computationally intensive that is typically performed on a general purpose processor. The resulting triangles may be filled by a two-dimensional processing engine in order to offload the general purpose processor.

Accordingly, it is desirable to use techniques other than triangulation to determine the pixels that are inside of the two-dimensional path in order to offload the general purpose processor and improve system performance for filling the two-dimensional path.

SUMMARY OF THE INVENTION

The current invention involves new systems and methods for identifying pixels that are inside a two-dimensional path. The path is segmented and a slope direction is determined for each pixel that is covered by the segmented path. The slope directions are stored in a derivative mask that may be integrated for each scanline to produce a fill mask. Alternatively, sub-pixel coverage information may be determined for each pixel and stored in the derivative mask. The resulting fill mask indicates the pixels that are inside the two-dimensional path. When the derivative mask includes sub-pixel coverage information, the fill mask may be used to produce an anti-aliased image including the shaded path.

Various embodiments of the invention set forth a method for identifying pixels that are inside a path include receiving a set of segments that approximates the path, identifying one or more covered pixels, wherein each covered pixel constitutes a pixel that is covered by a first segment in the set of segments, writing segment data in locations of the derivative mask, wherein each location corresponds to one of the covered pixels, and producing a fill mask by integrating the derivative mask for at least one scanline of the derivative mask to produce integrated derivative mask data for each pixel that is inside of the path.

Various embodiments of the invention set forth a method for identifying pixels that are inside a path using a derivative mask include receiving a first segment of a set of segments that approximates the path, receiving a control point that defines a curve between a first endpoint and a second endpoint of the first segment, identifying one or more covered pixels, wherein each covered pixel constitutes a pixel that is covered by the curve, and writing segment data in locations of the derivative mask, wherein each location corresponds to one of the covered pixels.

Various embodiments of the invention set forth a system for shading pixels that are inside a path that includes a rasterizer, a fragment processing pipeline, and a memory. The rasterizer is configured to rasterize pixels covered by a segment of the path and to determine segment data for each pixel covered by the segment. The fragment processing pipeline is coupled to the rasterizer and is configured to update a derivative mask based on the segment data for each covered pixel, to read the derivative mask, and to shade the pixels that are inside of the path. The memory is coupled to the fragment processing pipeline and is configured to store the derivative mask.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5C illustrates a fill mask corresponding to the derivative mask of FIG. 5B in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Systems and methods for identifying pixels that are inside a two-dimensional path may be used to fill the path. The path is segmented and a derivative mask is produced. The derivative mask includes segment data for each pixel covered by a segment. The segment data may be a slope direction or sub-pixel coverage information for each pixel. The derivative mask may be integrated for each scanline to produce a fill mask that indicates the pixels that are inside the two-dimensional path. Graphics processing engines typically used for processing three-dimensional primitives may be used to produce the derivative mask, integrate the derivative mask to produce a fill mask, and shade the path. The processing workload may be divided between a host processor and a graphics processor to improve the overall system performance for filling two-dimensional paths. For example, the host processor may perform segmentation of the path and the graphics processor may identify pixels that are inside of the path and shade those pixels.

Figure 1A:
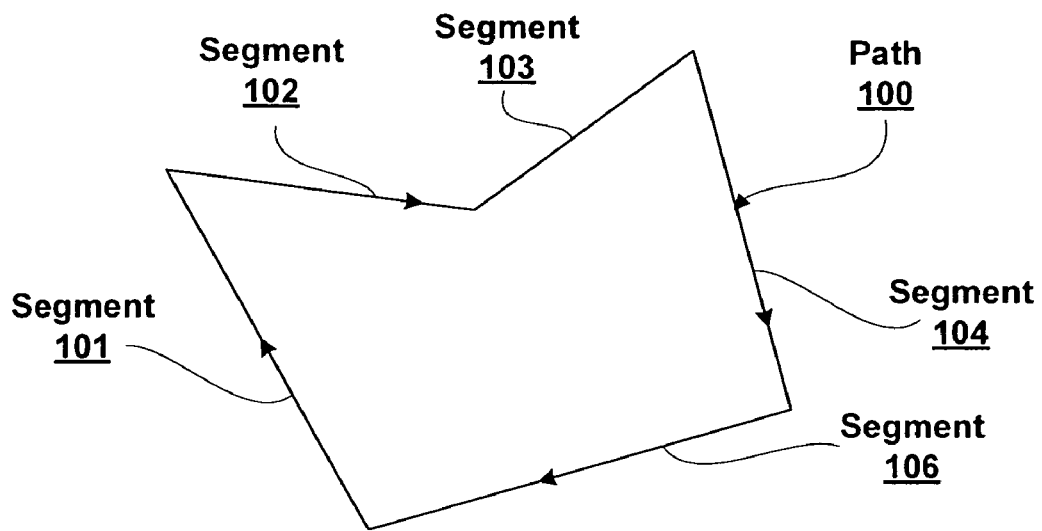
FIG. 1A illustrates a two-dimensional path in accordance with one or more aspects of the present invention.
Figure 1B:
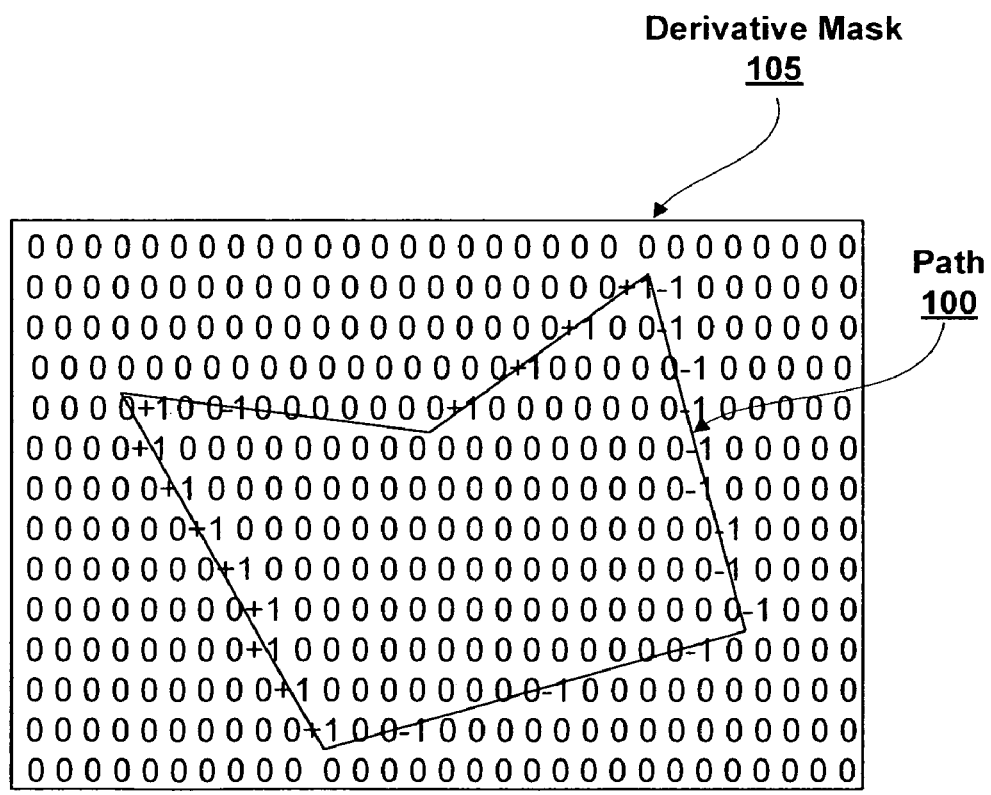
FIG. 1B illustrates a derivative mask corresponding to the two-dimensional path of FIG. 1A in accordance with one or more aspects of the present invention.

FIG. 1A illustrates a two-dimensional path, path 100, in accordance with one or more aspects of the present invention. The path has a direction, is closed, and may be self-intersecting. In order to fill the path, the pixels that are inside the path should be identified. FIG. 1B illustrates a derivative mask, derivative mask 105, that corresponds to the two-dimensional path of FIG. 1A, path 100, in accordance with one or more aspects of the present invention. Path 100 includes segments 101, 102, 103, 104, and 106. Path 100 is superimposed on derivative mask 105 in FIG. 1B in order to illustrate that the contents of derivative mask 105 correspond to path 100.

Derivative mask 105 may be produced by a graphics processor or a general purpose processor, e.g., host processor, central processing unit (CPU), or the like, and stored in memory. Derivative mask 105 includes a location corresponding to each pixel in a target image including path 100. In some embodiments of the present invention, each location stores a value that is at least two bits in size. Derivative mask 105 identifies a slope direction for each pixel that is along path 100. When the slope direction is upwards, i.e., a segment has a positive vertical slope component, such as segments 101 and 103, a value of +1 is stored for the slope direction. When the slope direction is downwards, i.e., a segment has a negative vertical slope component, such as segments 102, 104, and 106, a value of −1 is stored for the slope direction. Derivative mask 105 may be used to identify pixels that are inside of path 100.

Figure 1C:
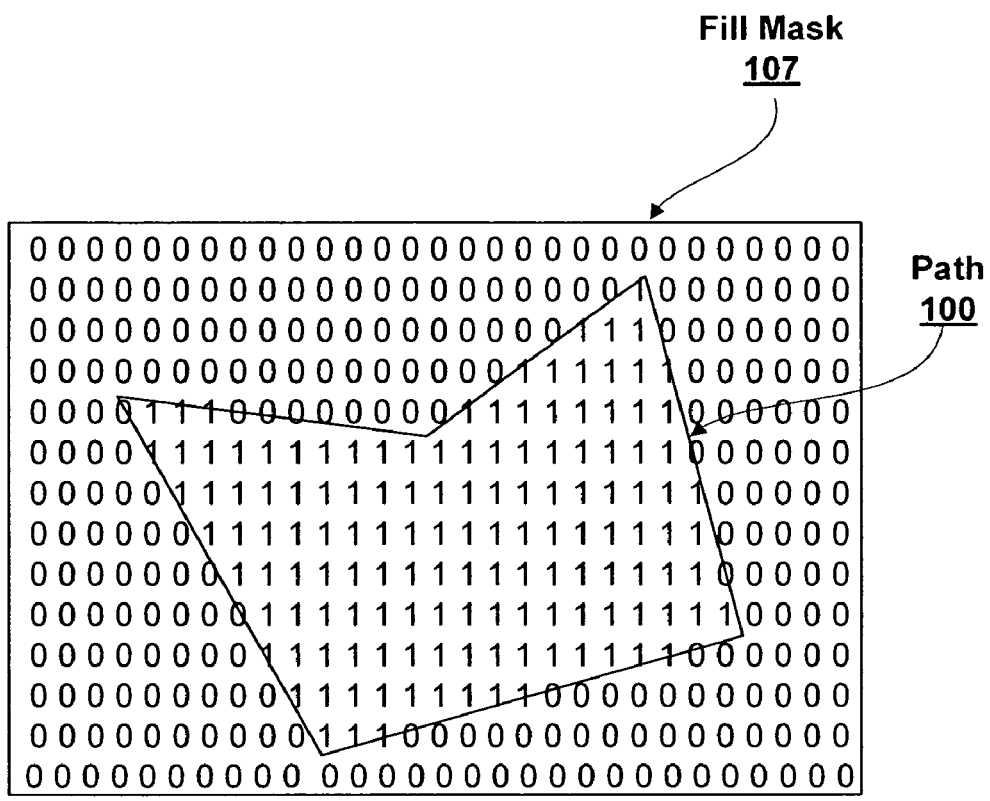
FIG. 1C illustrates a fill mask corresponding to the two-dimensional path of FIG. 1A in accordance with one or more aspects of the present invention.

FIG. 1C illustrates a fill mask, fill mask 107, corresponding to two-dimensional path 100 of FIG. 1A in accordance with one or more aspects of the present invention. Like derivative mask 105, fill mask 107 may also be produced by a graphics processor or a general purpose processor and stored in memory. Fill mask 107 includes a location corresponding to each pixel in the target image. Fill mask 107 is produced by integrating derivative mask 105 for each scanline of derivative mask 105. All of the locations in fill mask 107 are initialized to a value of 0. When a +1 is encountered for a scanline of derivative mask 105, the corresponding location in fill mask 107 is written with a 1. Each subsequent location along the scanline is written with a 1 until a −1 is encountered in derivative mask 105. When a −1 is encountered, it is summed with the +1 to produce 0, and 0 is written in the corresponding location in fill mask 107. A 0 is written in each subsequent location for the scanline until another +1 is encountered in derivative mask 105.

Fill mask 107 indicates the pixels that are inside of path 100. Specifically, any pixel location that stores a non-zero value is inside of path 100. Fill mask 107 may be used to shade path 100. A method of the present invention that may be used to produce derivative mask 105 and fill mask 107 is described in conjunction with FIG. 3.

Figure 1D:
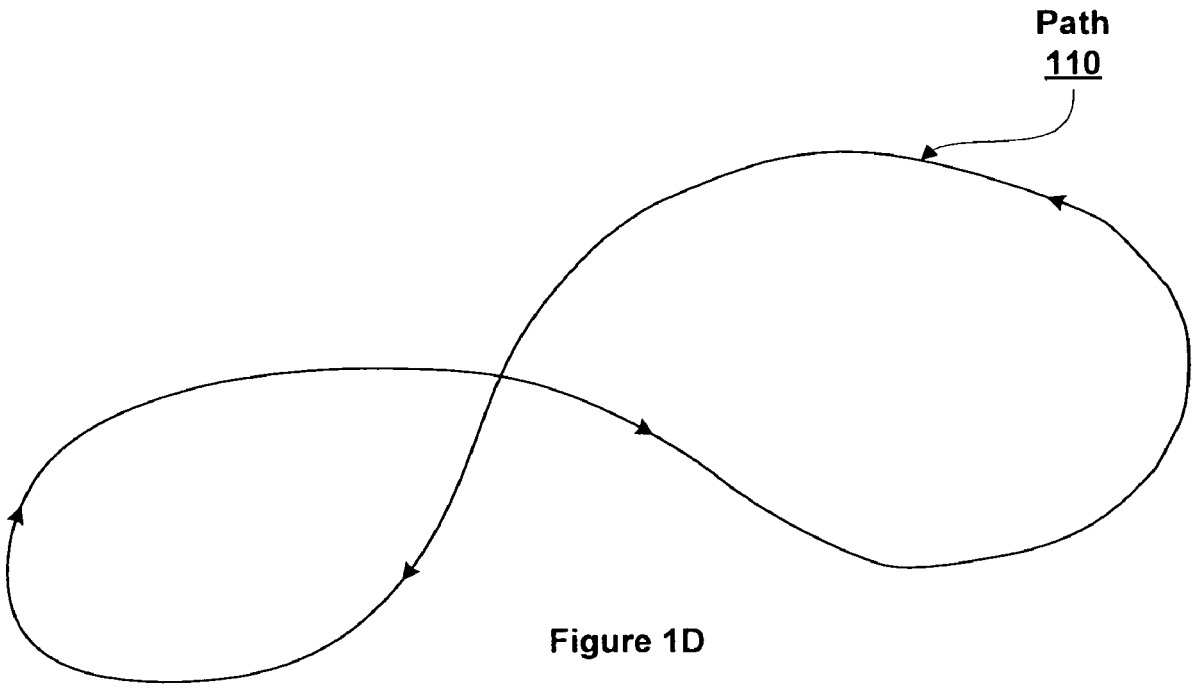
FIG. 1D illustrates another two-dimensional path in accordance with one or more aspects of the present invention.
Figure 1E:
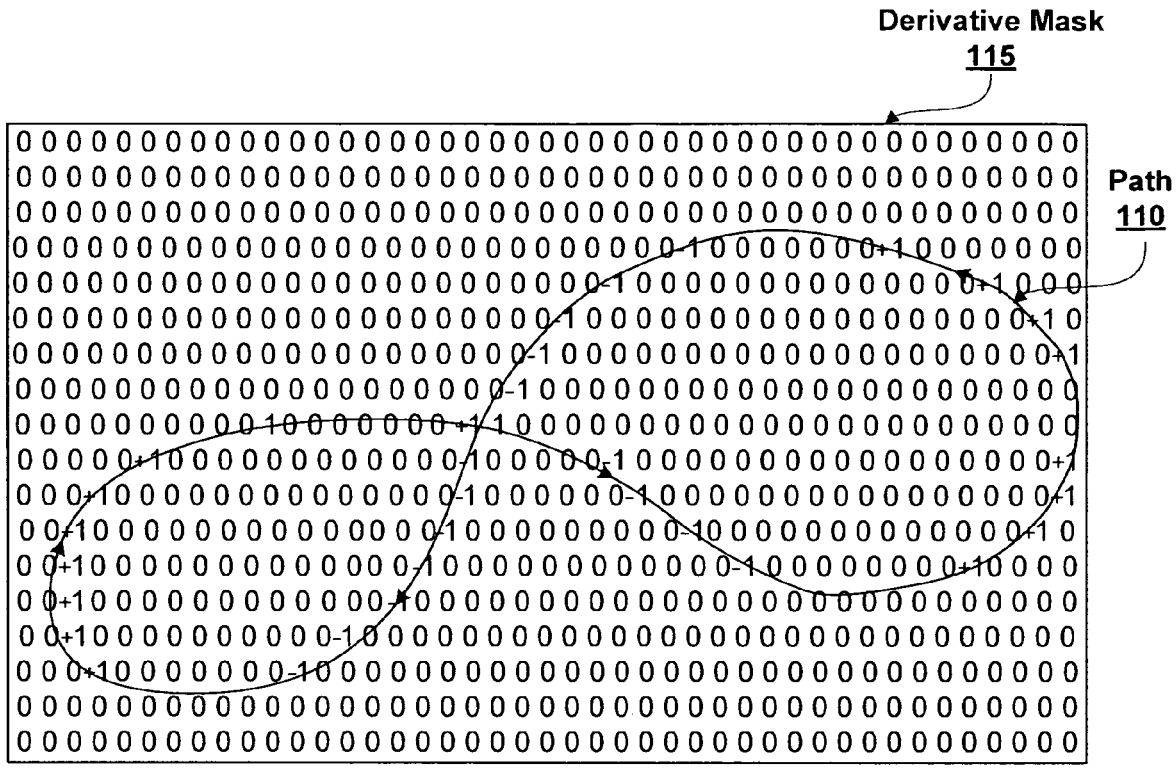
FIG. 1E illustrates a derivative mask corresponding to the two-dimensional path of FIG. 1E in accordance with one or more aspects of the present invention.

FIG. 1D illustrates another two-dimensional path, path 110, in accordance with one or more aspects of the present invention. FIG. 1E illustrates a derivative mask, derivative mask 115, corresponding to the two-dimensional path of FIG. 1D, path 110, in accordance with one or more aspects of the present invention. Path 110 is superimposed on derivative mask 115 in FIG. 1E in order to illustrate that the contents of derivative mask 115 correspond to path 110.

Like derivative mask 105, derivative mask 115 may also be produced by a graphics processor or a general purpose processor and stored in memory. Derivative mask 115 includes a location corresponding to each pixel in the target image. When the slope direction corresponding to a pixel is upwards, i.e., a pixel has a positive vertical slope component, a value of +1 is stored for the slope direction. When the slope direction for a pixel is downwards, i.e., a pixel has a negative vertical slope component, a value of −1 is stored for the slope direction. Derivative mask 115 may be used to identify pixels that are inside of path 110.

Figure 1F:
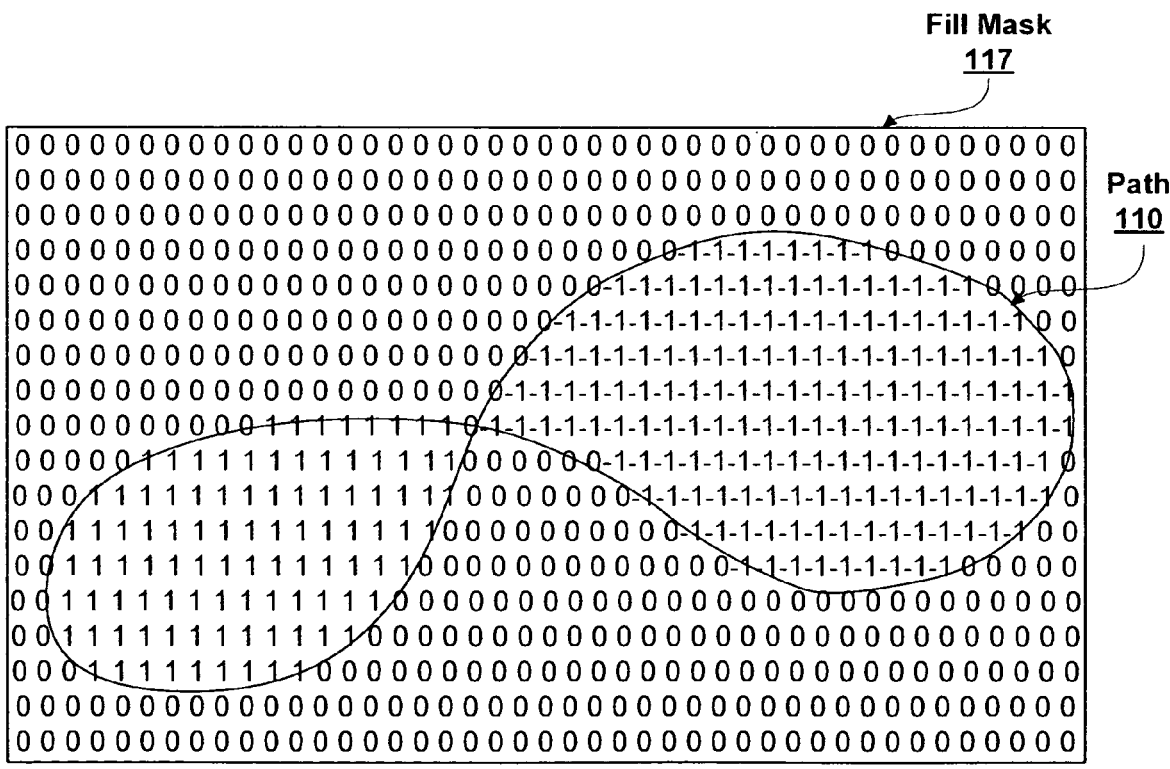
FIG. 1F illustrates a fill mask corresponding to the two-dimensional path of FIG. 1D in accordance with one or more aspects of the present invention.

FIG. 1F illustrates a fill mask, fill mask 117, corresponding to two-dimensional path 110 of FIG. 1D in accordance with one or more aspects of the present invention. Like derivative mask 115, fill mask 117 may also be produced by a graphics processor or a general purpose processor and may be stored in memory. Fill mask 117 includes a location corresponding to each pixel in the target image. Fill mask 117 is produced by integrating derivative mask 115 for each scanline of derivative mask 115. All of the locations in fill mask 107 are initialized to a value of 0. When a +1 or a −1 is encountered for a scanline of derivative mask 115, the +1 or −1 is summed with the value in the corresponding location in fill mask 117. Each subsequent location along the scanline is written with the summed value until another non-zero value is encountered in derivative mask 115.

Fill mask 117 indicates the pixels that are inside of path 110. Specifically, any pixel location that stores a non-zero value is inside of path 110. Fill mask 117 may be used to shade path 110. A method of the present invention that may be used to produce derivative mask 115 and fill mask 117 is described in conjunction with FIG. 4. The pixels that are inside of path 110 may be shaded dependent on a fill mode, e.g., odd/even or non-zero. For example, all non-zero value pixels may be shaded to fill the entire path, or all pixels with odd values may be shaded to fill path 110.

Figure 2A:
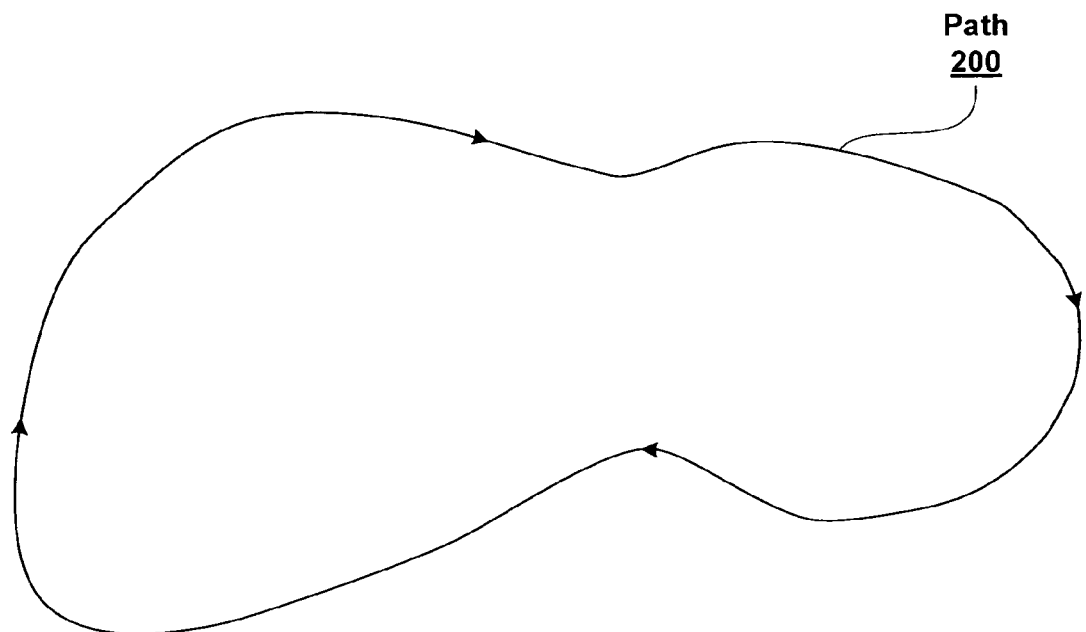
FIG. 2A illustrates a two-dimensional path with arrows indicating the direction of the path in accordance with one or more aspects of the present invention.
Figure 2B:
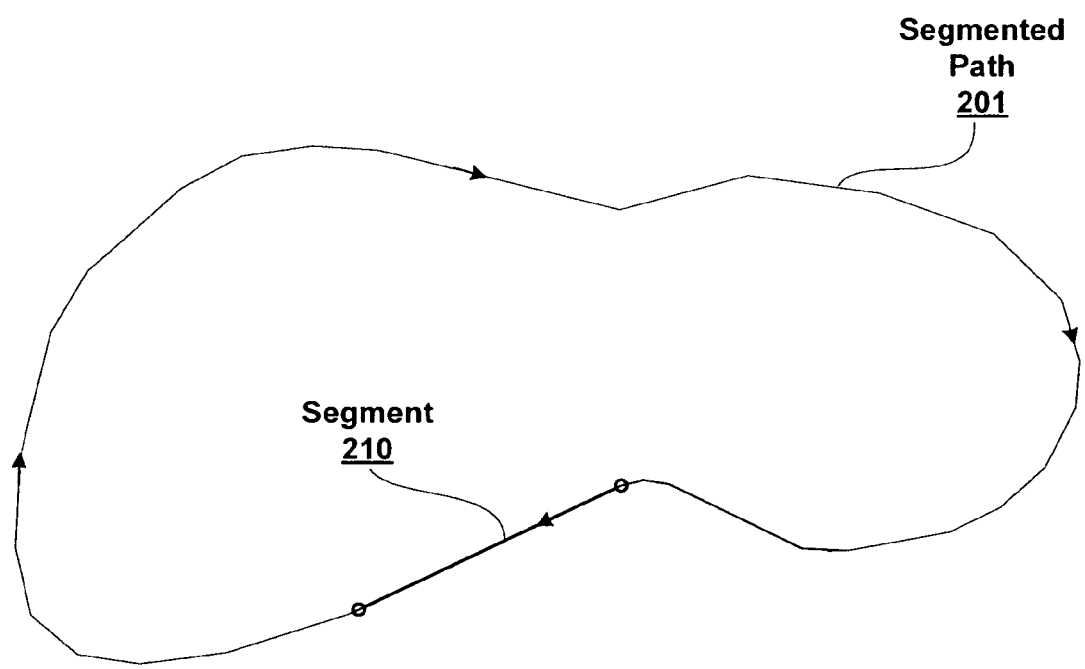
FIG. 2B illustrates the two-dimensional path of FIG. 2A that has been segmented in accordance with one or more aspects of the present invention.

FIG. 2A illustrates a two-dimensional path, path 200, with arrows indicating the direction of the path in accordance with one or more aspects of the present invention. FIG. 2B illustrates a segmented path, segmented path 201 that approximates path 200 of FIG. 2A in accordance with one or more aspects of the present invention. Segmented path 201 includes a segment 210.

Conventionally, a general purpose processor may be used to generate non-overlapping triangles to completely fill a path, such as path 200. Generating the non-overlapping triangles is a computationally intensive task. When the techniques of the present invention are used, the general purpose processor may instead, segment the path and produce a set of connected segments that approximate the path. Performing segmentation instead of triangulation reduces the computational workload performed by the general purpose processor and may improve overall system performance. A graphics processor may be used to determine the pixels that are inside of the segmented path and fill those pixels.

Figure 2C:
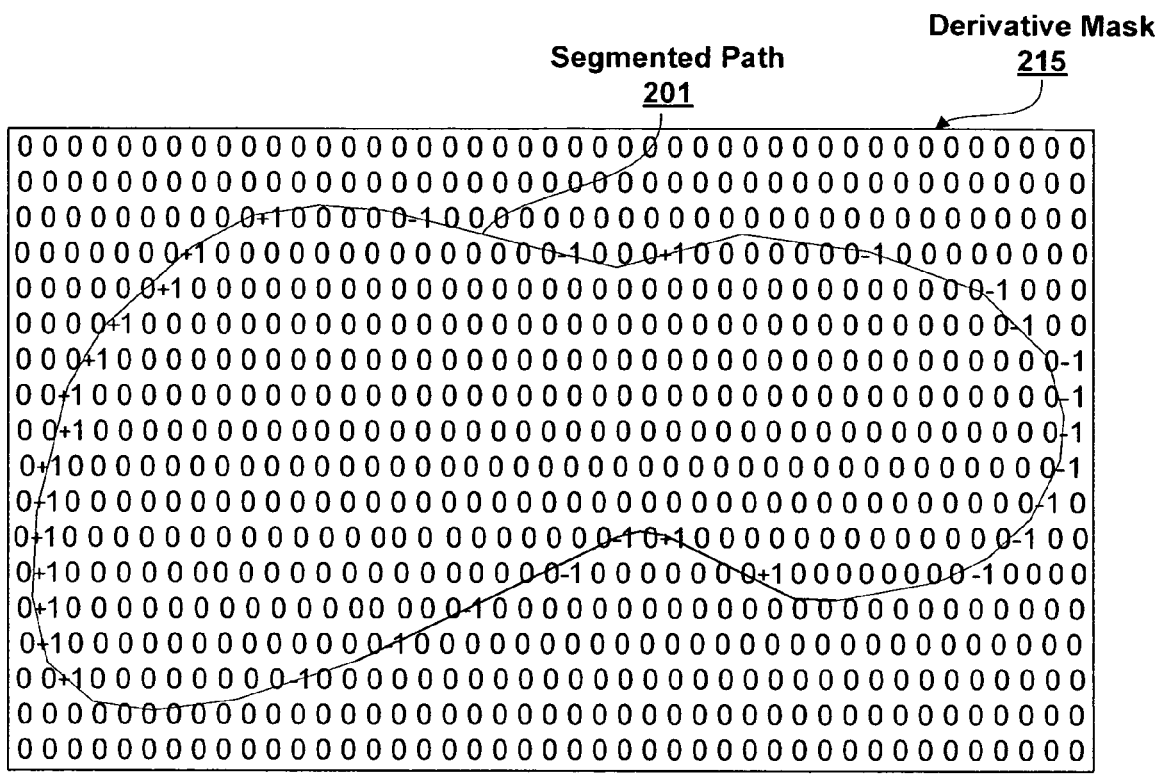
FIG. 2C illustrates a derivative mask corresponding to the segmented two-dimensional path of FIG. 2B in accordance with one or more aspects of the present invention.

FIG. 2C illustrates a derivative mask, derivative mask 215, corresponding to the segmented two-dimensional path of FIG. 2B in accordance with one or more aspects of the present invention. Segmented path 201 is superimposed on derivative mask 215 in FIG. 2C in order to illustrate that the contents of derivative mask 215 correspond to segmented path 201. Derivative mask 215 identifies a slope direction for each pixel that is along segmented path 201. When the slope direction for a segment is upwards, a slope direction of +1 is stored in each pixel location of derivative mask 215 that is covered by the segment. When the slope direction for a segment is downwards, such as for segment 210, a slope direction of −1 is stored in each pixel location of derivative mask 215 that is covered by the segment. After all of the segments in segmented path 201 are processed, derivative mask 215 may be used to identify pixels that are inside of path 201.

Figure 2D:
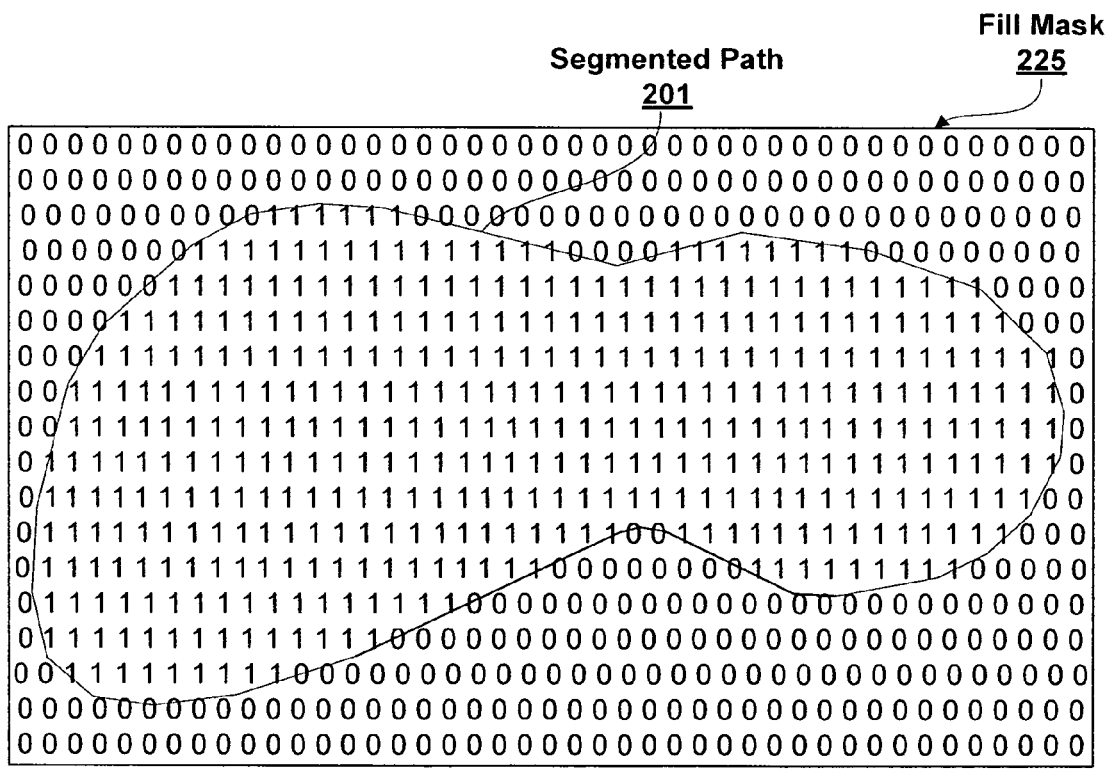
FIG. 2D illustrates a fill mask corresponding to the segmented two-dimensional path of FIG. 2B in accordance with one or more aspects of the present invention.

FIG. 2D illustrates a fill mask, fill mask 225, corresponding to segmented path 201 of FIG. 2B in accordance with one or more aspects of the present invention. Fill mask 225 is produced by integrating derivative mask 215 for each scanline of derivative mask 215. All of the locations in fill mask 225 are initialized to a value of 0. When a +1 or a −1 is encountered for a scanline of derivative mask 215, the +1 or −1 is summed with the value in the corresponding location in fill mask 225. Each subsequent location along the scanline is written with the summed value until another non-zero value is encountered in derivative mask 215. Fill mask 225 indicates the pixels that are inside of segmented path 201. Specifically, any pixel location that stores a non-zero value is inside of segmented path 201. Fill mask 225 may be used to shade path 200.

Figure 3:
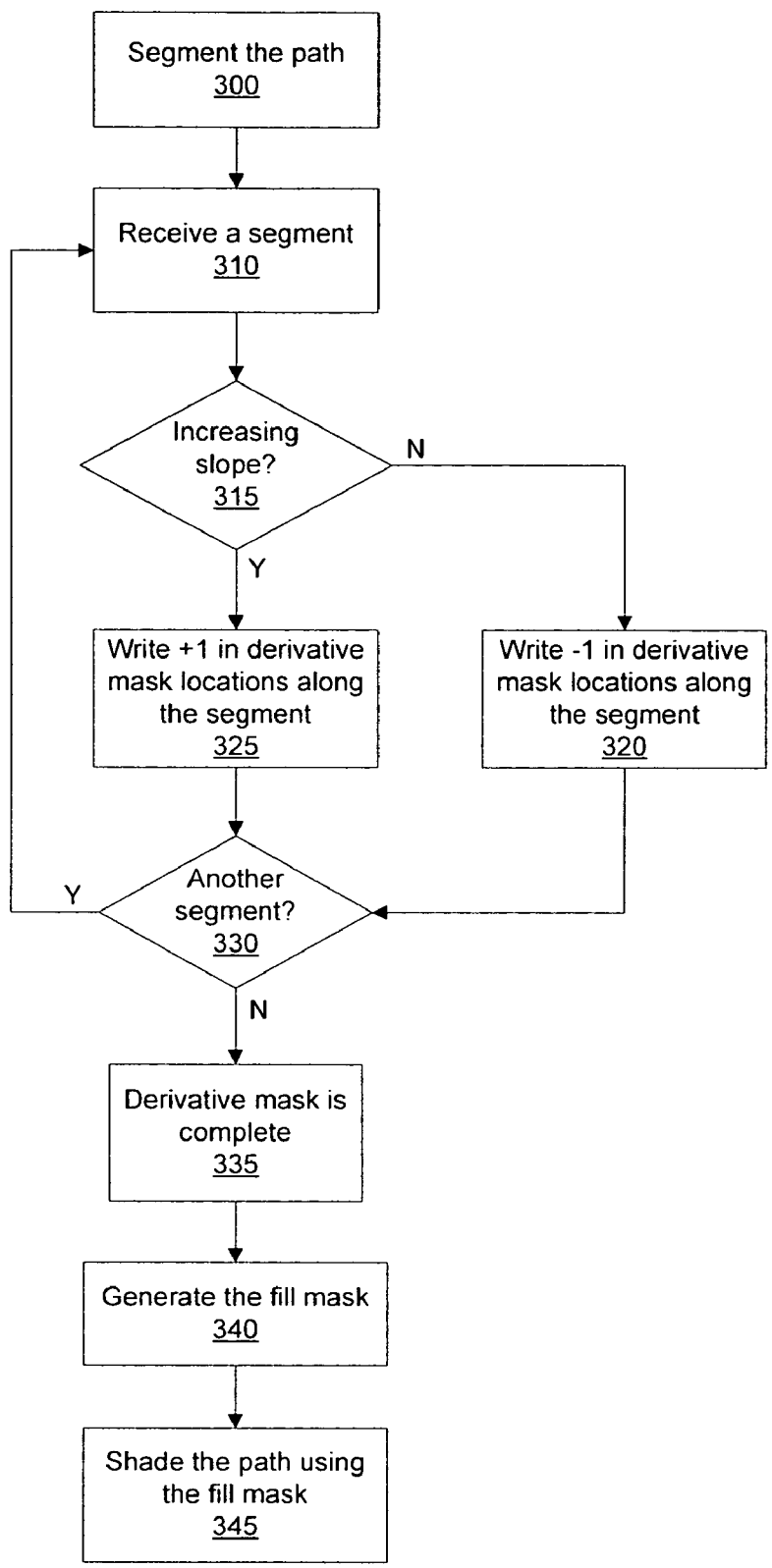
FIG. 3 illustrates a flow diagram of an exemplary method of producing a derivative mask for a path, using the derivative mask to identify pixels that are inside of the path, and shading the pixels in accordance with one or more aspects of the present invention.

FIG. 3 illustrates a flow diagram of an exemplary method of producing a derivative mask for a path, using the derivative mask to identify pixels that are inside of the path, and shading the pixels in accordance with one or more aspects of the present invention. In step 300 the path is segmented into a set of segments that approximates the path. As previously explained, path segmentation may be performed using techniques known to those skilled in the art and, in particular, segmentation may be performed by a general purpose processor.

In step 310 one of the segments in the set of segments is received by a general purpose processor or by a graphics processor. In step 315 the method determines if the slope direction of the segment is increasing or decreasing. Step 315 may be performed by a general purpose processor or by a graphics processor that includes a dedicated rasterization engine. If, in step 315 the method determines that the slope direction is not increasing, then in step 320 each location in the derivative mask that corresponds to a pixel that is covered by the segment is written with a −1. If, in step 315 the method determines that the slope direction is increasing, then in step 325 each location in the derivative mask that corresponds to a pixel that is covered by the segment is written with a +1.

In some embodiments of the present invention, the derivative mask is stored as a stencil buffer and locations in the derivative mask are updated, e.g., incremented, decremented, toggled, or the like, using a stencil operation, e.g. add, subtract, xor, or the like. In other embodiments of the present invention, the derivative mask is stored as an alpha buffer and locations in the derivative mask are updated using the slope direction, e.g., +1 for increasing, −1 for decreasing, or the like, as an alpha source value for each pixel covered by the segment and using an alpha blend mode of addition. In still other embodiments of the present invention, the derivative mask is stored as an accumulation buffer and locations in the derivative mask are updated using accumulation operations, e.g., addition, subtraction, xor, or the like.

In step 330 the method determines if another segment of the set of segments should be processed, and, if so, then the method returns to step 310. If, in step 330 the method determines that all of the segments in the set of segments have been processed, then in step 335 the derivative mask is complete. The derivative masks shown in FIGS. 1B, 1E, and 2C are examples of derivative masks that may be produced using this method. In step 340 the derivative mask may be used identify pixels that are inside of the path. Specifically, in step 340 each scanline of the derivative mask may be integrated to produce a fill mask. In some embodiments of the present invention, the fill mask is stored in memory and read to shade the pixels. In other embodiments of the present invention, the fill mask is computed for each pixel and used to shade the pixel directly, i.e., without being stored.

In step 345 the fill mask may be used to shade (fill) the pixels that are inside of the path. In other embodiments of the present invention, the derivative mask may be used to perform operations on the pixels that are either inside of the path or outside of the path. In some embodiments of the present invention, the derivative mask is read by a shader program and used to produce a fill mask and/or shaded pixels for the path. The fill mask may also be manipulated to blur or grow the mask edges, or the fill mask may be combined with another mask. Persons skilled in the art will appreciate that any system configured to perform the method steps of FIG. 3 or its equivalents, is within the scope of the present invention.

Figure 4:
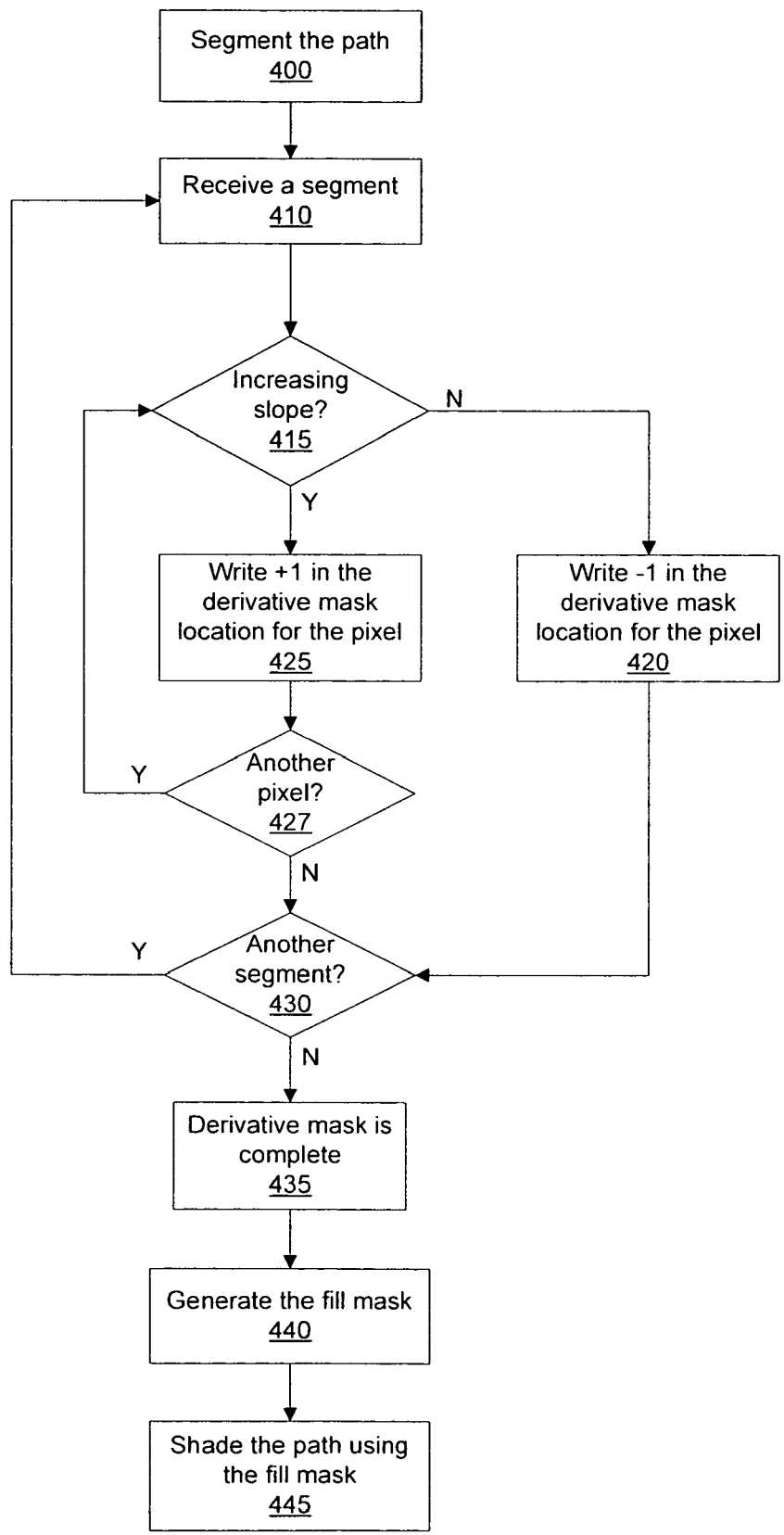
FIG. 4 illustrates a flow diagram of another exemplary method of producing derivative mask for a path, using the derivative mask to identify pixels that are inside of the path, and shading the pixels in accordance with one or more aspects of the present invention.

FIG. 4 illustrates a flow diagram of another exemplary method of producing derivative mask for a path, using the derivative mask to identify pixels that are inside of the path, and shading the pixels in accordance with one or more aspects of the present invention. In step 400 the path is segmented into a set of segments and control points that approximate the path. As previously explained, path segmentation may be performed using techniques known to those skilled in the art and, in particular, segmentation may be performed by a general purpose processor.

In step 410 one of the segments in the set of segments is received. Step 410 may be performed by a general purpose processor or by a graphics processor that includes a dedicated rasterization engine. In step 415 the slope direction is determined for a first pixel of the covered pixels. If, in step 415 the method determines that the slope direction for the first pixel is not increasing, then in step 420 the location in the derivative mask that corresponds to the first pixel is written with a −1. If, in step 415 the method determines that the slope direction of the first pixel is increasing, then in step 425 the location in the derivative mask that corresponds to the first pixel is written with a +1. In step 427 the method determines if another pixel of the covered pixels should be processed, and, if so, then the method returns to step 415. If, in step 427 the method determines that all of the covered pixels have been processed, then method proceeds to step 430.

In step 430 the method determines if another segment of the set of segments should be processed, and, if so, then the method returns to step 410. If, in step 430 the method determines that all of the segments in the set of segments have been processed, then in step 435 the derivative mask is complete. In step 440 the derivative mask may be used identify pixels that are inside of the path. Specifically, in step 440 each scanline of the derivative mask may be integrated to produce a fill mask. In some embodiments of the present invention, the fill mask is stored in memory and read to shade the pixels. In other embodiments of the present invention, the fill mask is computed for each pixel and used to shade the pixel directly, i.e., without being stored.

In step 445 the fill mask may be used to shade (fill) the pixels that are inside of the path. In other embodiments of the present invention, the fill mask may be used to perform operations on the pixels that are either inside of the path or outside of the path. In some embodiments of the present invention, the fill mask is read by a shader program and used to produce shaded pixels for the path. Persons skilled in the art will appreciate that any system configured to perform the method steps of FIG. 4 or their equivalent, is within the scope of the present invention.

A derivative mask may be used to produce an anti-aliased image including the shaded path. For example, the derivative mask and the fill mask may be higher resolution than the render target. The fill mask may be supersampled to produce an anti-aliased fill mask for shading the path. In other embodiments of the present invention, the segment data stored in the derivative mask may be sub-pixel coverage information indicating how much of each covered pixel is covered, as described in conjunction with FIGS. 5A, 5B, 5C and 6. In some embodiments of the present invention, each location of the derivative mask stores a value that is at least one bit in size. The methods of the present invention described in conjunction with FIG. 4 may be used to produce a derivative mask with segment data that is sub-pixel coverage information in order to produce an anti-aliased fill mask for shading the path.

Figures 5A, 5B:
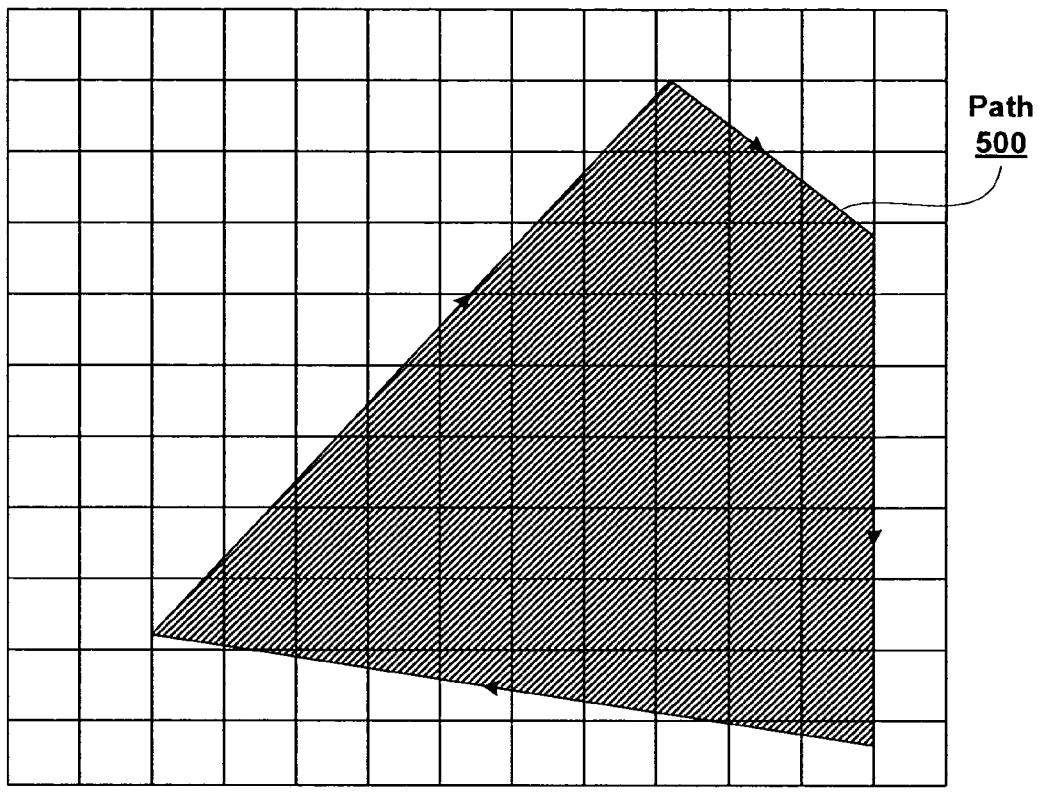
FIG. 5A illustrates a two-dimensional path with arrows indicating the direction of the path in accordance with one or more aspects of the present invention.
FIG. 5B illustrates a derivative mask including coverage derivatives corresponding to the two-dimensional path of FIG. 6A in accordance with one or more aspects of the present invention.

FIG. 5A illustrates a two-dimensional path, path 500, with arrows indicating the direction of the path in accordance with one or more aspects of the present invention. Path 500 is superimposed over a pixel grid to indicate the pixel coverage. When one sample is used for each pixel, a pixel is considered to be covered when the sample position, e.g., pixel center, within the pixel is covered. During shading, each covered pixel is filled and each uncovered pixel remains unfilled. When sub-pixel samples are used for each pixel, shading of each pixel may vary depending on the number of sub-pixel samples that are covered, thereby producing a shaded path that is anti-aliased, i.e. with "soft edges."

FIG. 5B illustrates a derivative mask, derivative mask 505, including coverage information, e.g. coverage derivatives, corresponding to path 500 of FIG. 5A in accordance with one or more aspects of the present invention. A coverage derivative is stored for each pixel in derivative mask 505. Each coverage derivative indicates a change in coverage as the scanline is traversed from left to right. Like the slope directions, the coverage derivatives may be integrated across each scanline of derivative mask 505 to produce a fill mask for path 500. The sub-pixel coverage for each pixel may be computed using techniques known to those skilled in the art.

FIG. 5C illustrates a fill mask, fill mask 510, corresponding to derivative mask 505 of FIG. 5B in accordance with one or more aspects of the present invention. Each location in fill mask 505 corresponds to a pixel and stores the sub-pixel coverage for the pixel. Fill mask 505 may be stored as an alpha mask and used to shade the pixels that are inside of path 500 using alpha blending. As previously described, fill mask 510 is produced by integrating the derivative mask 505 for each scanline. For example, to produce values 0, 0.38, 0.68, 0.16, and 0 of the second row of fill mask 510, 0.38 of the second row of derivative mask 505 is summed with 0 to produce the sub-pixel coverage of 0.38, 0.30 is summed with 0.38 to produce the sub-pixel coverage of 0.68, −0.52 is summed with 0.68 to produce the sub-pixel coverage of 0.16, and −0.16 is summed with 0.16 to produce the sub-pixel coverage of 0, respectively.

Figure 6:
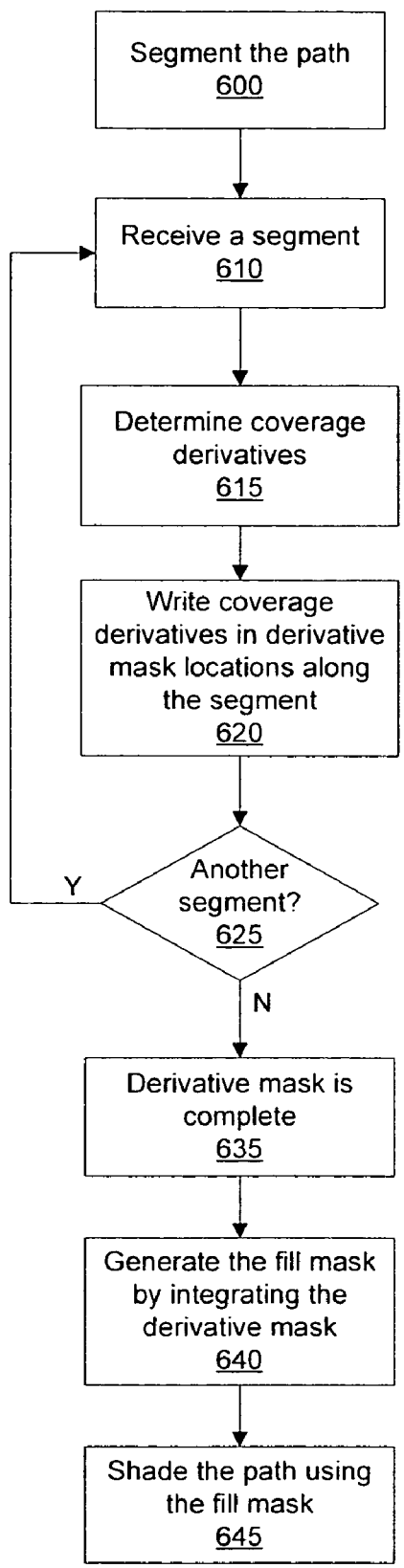
FIG. 6 illustrates a flow diagram of an exemplary method of producing derivative mask that includes coverage information for a path, using the derivative mask to identify pixels that are inside of the path, and shading the pixels in accordance with one or more aspects of the present invention.
Figure 7:
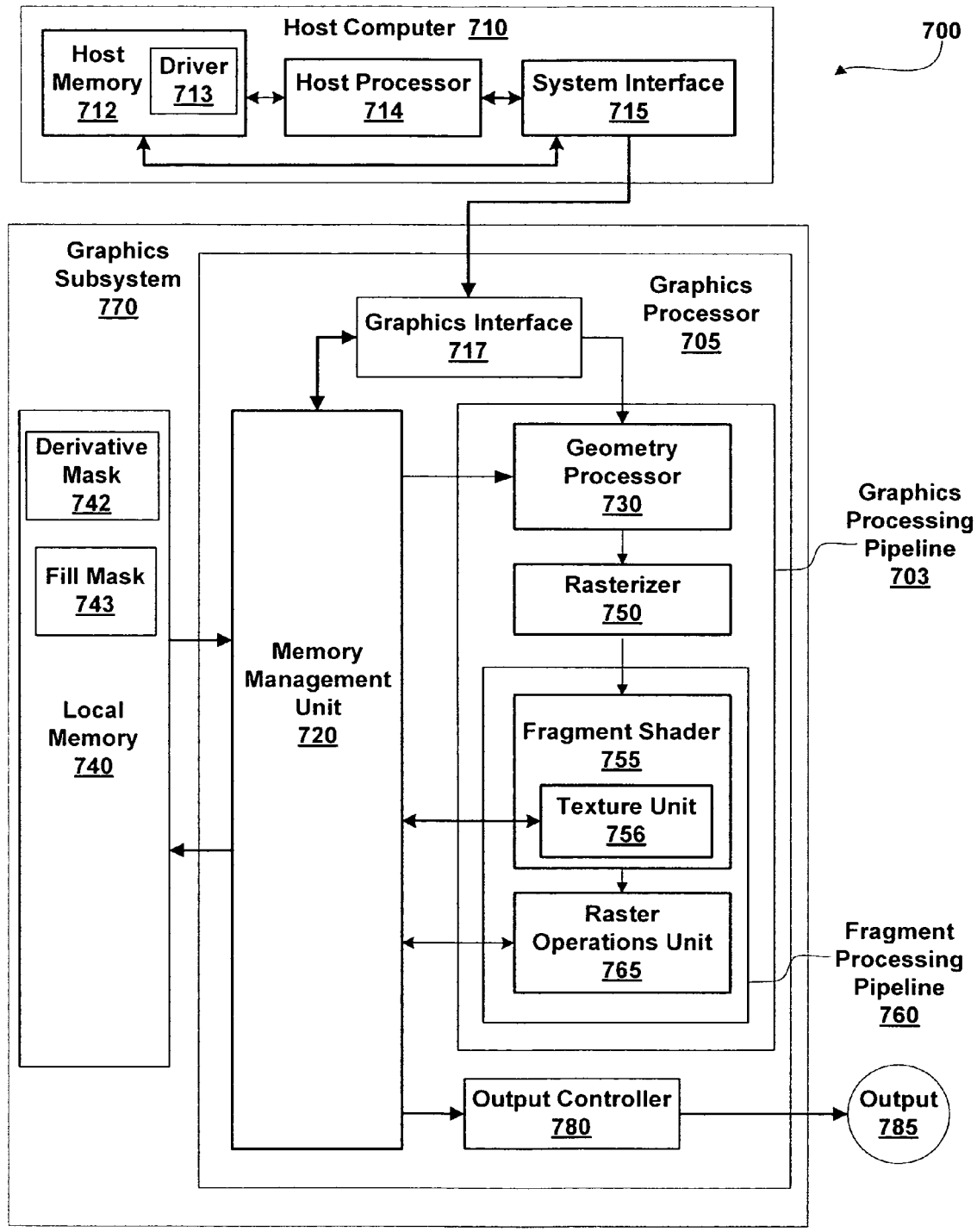
FIG. 7 is a block diagram of a graphics processing system in accordance with one or more aspects of the present invention.

FIG. 6 illustrates a flow diagram of an exemplary method of producing a derivative mask, such as derivative mask 505 that includes coverage information for a path, using the derivative mask to identify pixels that are inside of the path, and shading the pixels in accordance with one or more aspects of the present invention. In step 600 the path is segmented into a set of segments that approximate the path. In some embodiments of the present invention, the set of segments include control points that specify curves corresponding to the segments. As previously explained, path segmentation may be performed using techniques known to those skilled in the art and, in particular, segmentation may be performed by a general purpose processor.

In step 610 one of the segments in the set of segments is received. In step 615 coverage derivatives are determined for each pixel that is at least partially covered by the segment. In some embodiments of the present invention, at least one control point is specified for each segment to define a curve. In those embodiments, coverage derivatives are determined for each pixel that is at least partially covered by the curve in step 615. Step 615 may be performed by a general purpose processor or by a graphics processor that includes a dedicated rasterization engine. In step 620 the coverage derivatives determined in step 615 are written in the derivative mask locations that correspond to each pixel that is at least partially covered by the segment.

In step 625 the method determines if another segment of the set of segments should be processed, and, if so, then the method returns to step 610. If, in step 625 the method determines that all of the segments in the set of segments have been processed, then in step 635 the derivative mask is complete. In step 640 the derivative mask may be used identify pixels that are inside of the path and define the coverage for each pixel. Specifically, in step 640 each scanline of the derivative mask may be integrated to produce a fill mask. In some embodiments of the present invention, the fill mask is an alpha mask that is stored in memory and read to shade the pixels. In other embodiments of the present invention, the fill mask is computed for each pixel and used to shade the pixel directly, i.e., without being stored.

In step 645 the fill mask may be used to shade (fill) the pixels that are inside of the path. In other embodiments of the present invention, the fill mask may be used to perform operations on the pixels that are either inside of the path or outside of the path. In some embodiments of the present invention, the fill mask is read by a shader program and used to produce shaded pixels for the path. Persons skilled in the art will appreciate that any system configured to perform the method steps of FIG. 6 or their equivalent, is within the scope of the present invention.

FIG. 8 is a block diagram of an exemplary embodiment of a respective computer system, generally designated 800, and including a host computer 810 and a graphics subsystem 807 in accordance with one or more aspects of the present invention. The methods described in conjunction with FIGS. 3, 4, and 6 may be performed using host computer 810 and graphics subsystem 807. Computing system 800 may be a desktop computer, server, laptop computer, palm-sized computer, tablet computer, game console, portable wireless terminal such as a PDA or cellular telephone, computer based simulator, or the like. Host computer 810 includes host processor 814 that may include a system memory controller to interface directly to host memory 812 or may communicate with host memory 812 through a system interface 815. System interface 815 may be an I/O (input/output) interface or a bridge device including the system memory controller to interface directly to host memory 812. An example of system interface 815 known in the art includes Intel® Northbridge.

Host processor 814 may be configured to perform step 300 of FIG. 3, step 400 of FIG. 4, and step 600 of FIG. 6 to produce segmented paths. Host processor 814 may also be configured to determine slope directions of segments and provide the slope directions to graphics processor 805 for use during generation of the derivative mask.

A graphics device driver, driver 813, interfaces between processes executed by host processor 814, such as application programs, and a programmable graphics processor 805, translating program instructions as needed for execution by programmable graphics processor 805. Driver 813 also uses commands to configure sub-units within programmable graphics processor 805. Specifically, driver 813 may provide programmable graphics processor 805 with sets of segments, produced by host processor 814, that approximate two-dimensional paths.

Graphics subsystem 807 includes a local memory 840 and programmable graphics processor 805. Host computer 810 communicates with graphics subsystem 870 via system interface 815 and a graphics interface 817 within programmable graphics processor 805. Data, program instructions, and commands received at graphics interface 817 can be passed to a graphics processing pipeline 803 or written to a local memory 840 through memory management unit 820. Programmable graphics processor 805 uses memory to store graphics data, including texture maps, and program instructions, where graphics data is any data that is input to or output from computation units within programmable graphics processor 805. Graphics memory is any memory used to store graphics data, including render targets, or program instructions to be executed by programmable graphics processor 805. Graphics memory can include portions of host memory 812, local memory 840 directly coupled to programmable graphics processor 805, storage resources coupled to the computation units within programmable graphics processor 805, and the like. Storage resources can include register files, caches, FIFOs (first in first out memories), and the like.

In addition to Interface 817, programmable graphics processor 805 includes a graphics processing pipeline 803, a memory management unit 820 and an output controller 880. Data and program instructions received at interface 817 can be passed to a geometry processor 830 within graphics processing pipeline 803 or written to local memory 840 through memory management unit 820. In addition to communicating with local memory 840 and interface 817, memory management unit 820 also communicates with graphics processing pipeline 803 and output controller 880 through read and write interfaces in graphics processing pipeline 803 and a read interface in output controller 880.

Within graphics processing pipeline 803, geometry processor 830 and a programmable graphics fragment processing pipeline, fragment processing pipeline 860, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 830 and fragment processing pipeline 860 are optionally configured such that data processing operations are performed in multiple passes through graphics processing pipeline 803 or in multiple passes through fragment processing pipeline 860. Each pass through programmable graphics processor 805, graphics processing pipeline 803 or fragment processing pipeline 860 concludes with optional processing by a raster operations unit 865.

Vertex programs are sequences of vertex program instructions compiled by host processor 814 for execution within geometry processor 830 and rasterizer 850. Shader programs are sequences of shader program instructions compiled by host processor 814 for execution within fragment processing pipeline 860. Geometry processor 830 receives a stream of program instructions (vertex program instructions and shader program instructions) and data from interface 817 or memory management unit 820, and performs vector floating-point operations or other processing operations using the data. The program instructions configure subunits within geometry processor 830, rasterizer 850 and fragment processing pipeline 860. The program instructions and data are stored in graphics memory, e.g., portions of host memory 812, local memory 840, or storage resources within programmable graphics processor 805. When a portion of host memory 812 is used to store program instructions and data the portion of host memory 812 can be uncached so as to increase performance of access by programmable graphics processor 805. Alternatively, configuration information is written to registers within geometry processor 830, rasterizer 850 and fragment processing pipeline 860 using program instructions, encoded with the data, or the like.

Data processed by geometry processor 830 and program instructions are passed from geometry processor 830 to a rasterizer 850. Rasterizer 850 is a sampling unit that processes primitives and generates sub-primitive data, such as fragment data, including parameters associated with fragments (texture identifiers, texture coordinates, sub-pixel coverage, slope directions, and the like). Rasterizer 850 converts the primitives, e.g., segments, into sub-primitive data by performing scan conversion on the data processed by geometry processor 830. In addition to determining the slope direction for each segment, rasterizer 850 may be configured to perform steps 315 of FIG. 3 and step 615 of FIG. 6. Rasterizer 850 outputs segment data, e.g., sub-pixel coverage information and slope directions, and shader program instructions to fragment processing pipeline 860.

The shader programs configure the fragment processing pipeline 860 to process fragment data by specifying computations and computation precision. Fragment shader 855 is optionally configured by shader program instructions such that fragment data processing operations are performed in multiple passes within fragment shader 855. Fragment shader 855 may include a texture unit 856 that reads from texture maps stored in graphics memory.

Fragment shader 855 may be configured to generate a fill mask by integrating a derivative mask read from memory, such as derivative mask 842. For example, derivative mask 842 may be used by fragment shader 855 to complete step 340 of FIG. 3, step 440 of FIG. 4, and step 640 of FIG. 6. Texture map data may also be applied to the fragment data using techniques known to those skilled in the art to produce shaded fragment data. The texture data may be produced by graphics processor 805 and stored in graphics memory for use during the processing of fragment data. Fragment shader 855 may also be configured to shade two-dimensional paths using a fill mask. For example, a fill mask stored in memory, such as fill mask 843 may be read by texture unit 856 and used by fragment shader 855 to complete step 345 of FIG. 3, step 445 of FIG. 4, and step 645 of FIG. 6. In other embodiments of the present invention, fragment shader 855 may be configured to compute each fill mask value and use those values directly, i.e. without storing the values in fill mask 843, to produce shaded pixels for the path.

Fragment shader 855 outputs the shaded fragment data, e.g., slope directions, coverage derivatives, color, depth, and codewords generated from shader program instructions to raster operations unit 865. Raster operations unit 865 includes a read interface and a write interface to memory management unit 820 through which raster operations unit 865 accesses data stored in local memory 840 or host memory 812. Raster operations unit 865 optionally performs near and far plane clipping and raster operations, such as stencil, z test, alpha blending, and the like, using the fragment data and pixel data stored in local memory 840 or host memory 812 at a pixel position (image location specified by x,y coordinates) associated with the processed fragment data. Raster operations unit 865 may be configured to write slope directions or coverage derivatives into a derivative mask to perform steps 320 and 325 of FIG. 3, steps 420 and 425 of FIG. 4, and step 620 of FIG. 6. Raster operations unit 865 may also be configured to shade a path using a fill mask to perform steps 345 of FIG. 3, step 445 of FIG. 4, and step 645 of FIG. 6. For example, fill mask 843 may be used as an alpha buffer to perform alpha blending to shade a path or fill mask 843 may be used as a stencil buffer to shade the path. The output data from raster operations unit 865 is written back to local memory 840 or host memory 812 at the pixel position associated with the output data and the results, e.g., derivative mask, fill mask, image data, or the like are saved in a render target, e.g., stencil buffer, alpha buffer, accumulation buffer, image buffer, or the like, stored in graphics memory.

When processing is completed, an output 885 of graphics subsystem 807 is provided using output controller 880. Alternatively, host processor 814 reads the image stored in local memory 840 through memory management unit 820, interface 817 and system interface 815. Output controller 880 is optionally configured by opcodes to deliver data to a display device, network, electronic control system, other computing system 800, other graphics subsystem 807, or the like.

The present invention may be used to identify pixels that are inside a two-dimensional path in order to shade the path. The processing workload may be divided between a host processor and a graphics processor to improve the overall system performance for filling two-dimensional paths. For example, the host processor may perform segmentation of the path and the graphics processor may identify pixels that are inside of the path by producing a derivative buffer and shade those pixels based on the derivative buffer. Coverage derivatives may be computed and stored in the derivative buffer in order to produce an image including an anti-aliased shaded path.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners. The invention claimed is:

1. A method of identifying pixels that are inside of a path using a derivative mask, comprising:
   receiving a first segment of a set of segments that approximates the path;
   receiving a control point that defines a curve between a first endpoint and a second endpoint of the first segment;
   identifying one or more covered pixels, wherein each covered pixel constitutes a pixel that is covered by the curve;
   writing segment data in locations of the derivative mask that is stored in a graphics memory, wherein each location corresponds to one of the covered pixels, and the segment data includes a slope direction for each covered pixel that is based on a direction of the path;
   shading each pixel that is inside the path using a graphics processor to produce shaded pixels of an image, wherein the pixels that are shaded correspond to locations of the fill mask that contain odd values, and pixels that are not shaded correspond to locations of the fill mask that contain zero or even values; and
   storing the shaded pixels of the image in the graphics memory.

2. The method of claim 1, further comprising producing a fill mask by integrating the derivative mask for at least one scanline of the derivative mask to produce integrated derivative mask data for each pixel that is inside of the path.

3. The method of claim 1, wherein the step of writing comprises rasterizing the first segment and producing sub-pixel coverage information for the one or more covered pixels, and the segment data comprises the sub-pixel coverage information.

4. A system for shading pixels that are inside a path, comprising:
   a rasterizer configured to rasterize pixels covered by a segment of the path and to determine segment data that includes a slope direction based on a direction of the path for each pixel covered by the segment, wherein the segment data includes a coverage derivative for each covered pixel, the coverage derivative indicating a change in sub-pixel coverage as a scanline is traversed;
   a fragment processing pipeline coupled to the rasterizer and configured to update a derivative mask based on the segment data for each pixel covered by the segment, to read the derivative mask, to produce a fill mask that indicates sub-pixel coverage values for the pixels that are inside of the path by integrating the derivative mask across each scanline that includes a pixel that is intersected by the path, and to shade the pixels that are inside of the path; and
   a memory coupled to the fragment processing pipeline and configured to store the derivative mask.

5. The system of claim 4, wherein the fragment processing pipeline is configured to produce a fill mask by integrating the derivative mask across each scanline that includes a pixel that is intersected by the path, and the fill mask indicates the pixels that are inside of the path.

6. The system of claim 4, further comprising a host processor coupled to the rasterizer and configured to determine a set of segments that includes the segment and approximates the path.

* * * * *